April 1, 1941.                H. L. STRIEGEL                2,236,551
MATERIAL CONTROL MEANS FOR SPRAY APPLIANCES
Filed April 6, 1939                    2 Sheets-Sheet 1
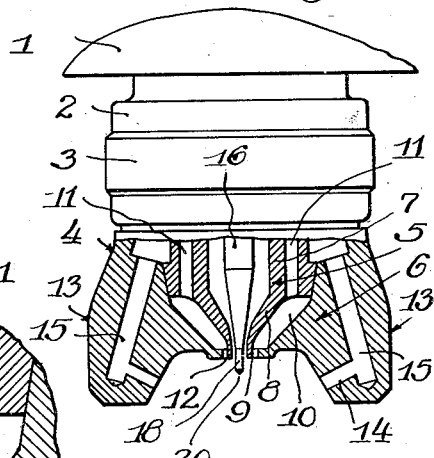
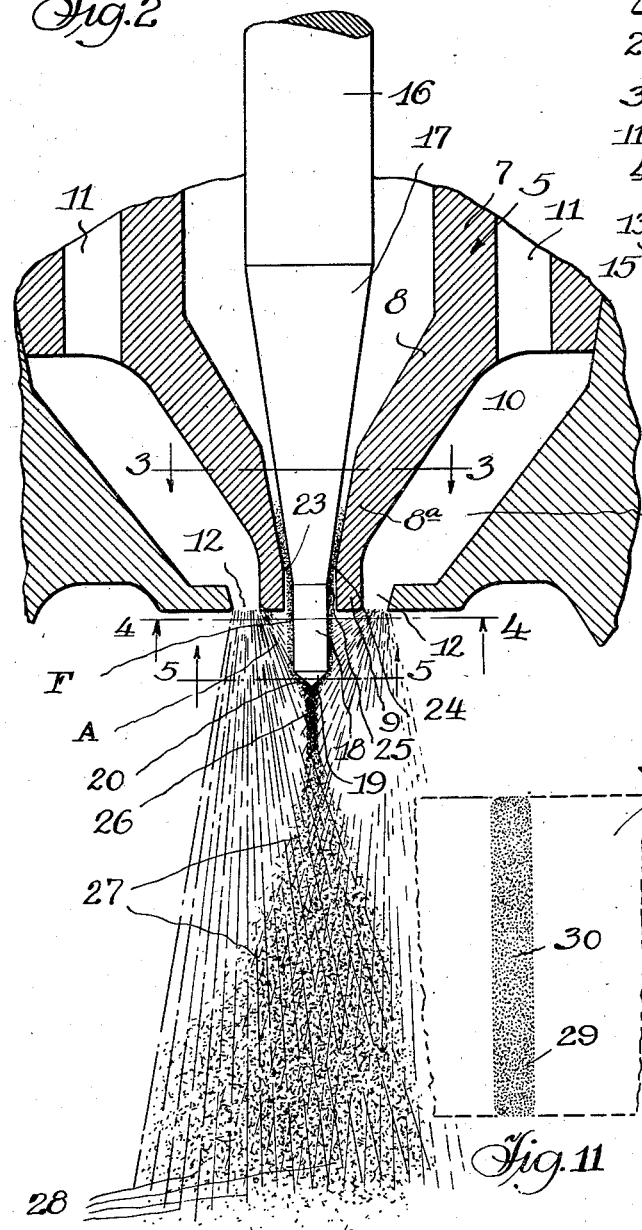
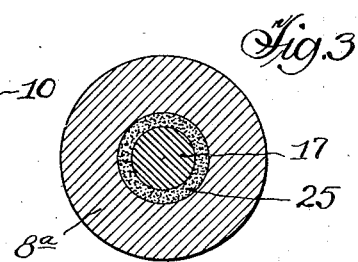
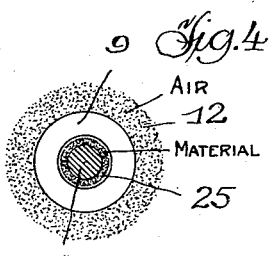
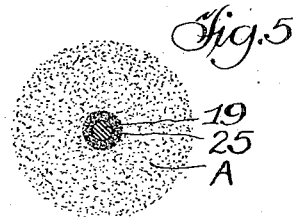
INVENTOR.
Harold L. Striegel,
By Louis A. Bisson, ATTORNEY.

April 1, 1941.  H. L. STRIEGEL  2,236,551
MATERIAL CONTROL MEANS FOR SPRAY APPLIANCES
Filed April 6, 1939  2 Sheets-Sheet 2
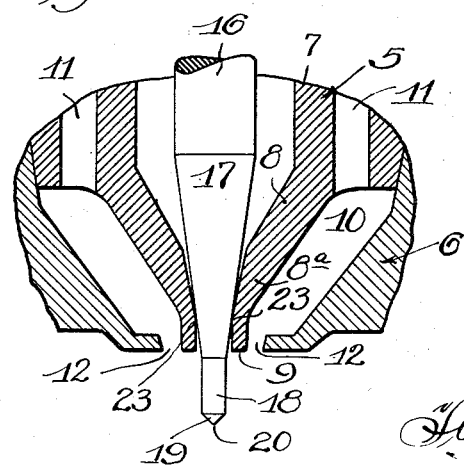
Fig. 6
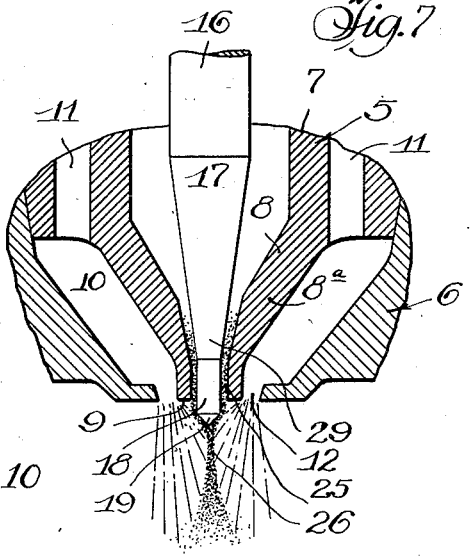
Fig. 7
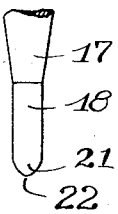
Fig. 10
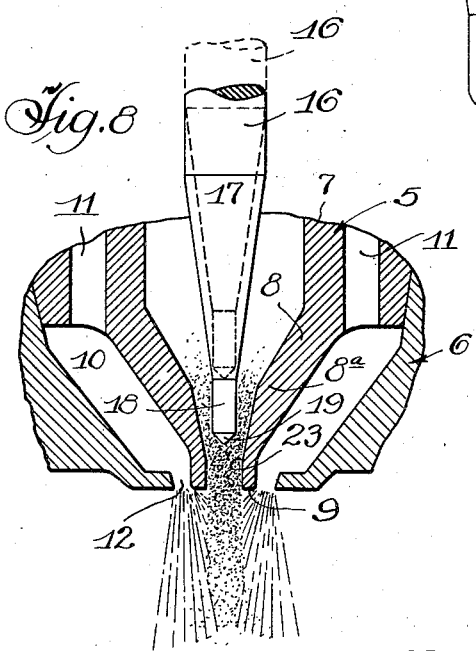
Fig. 8
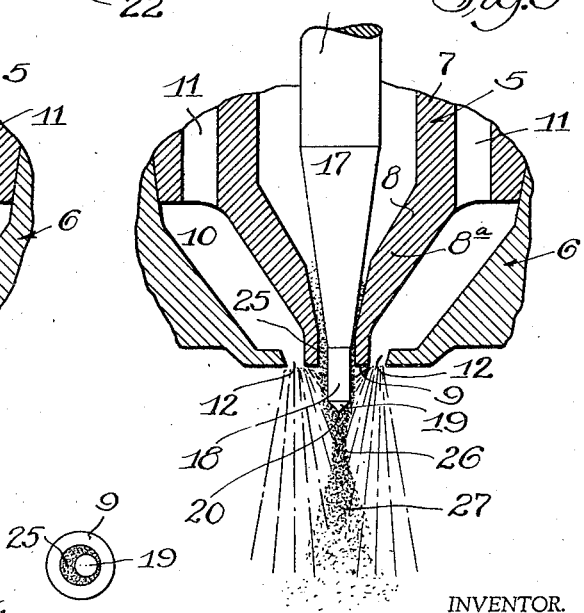
Fig. 9
Fig. 12
INVENTOR.
Harold L. Striegel
By Louis A. Bisson, ATTORNEY.

Patented Apr. 1, 1941

2,236,551

UNITED STATES PATENT OFFICE 2,236,551

MATERIAL CONTROL MEANS FOR SPRAY APPLIANCES

Harold L. Striegel, Chicago, Ill., assignor to Binks Manufacturing Company, Chicago, Ill., a corporation of Delaware Application April 6, 1939, Serial No. 266,344

5 Claims. (Cl. 299—141)

The present invention relates to spray gun nozzles and more particularly to the valve means thereof which controls the projecting of the coating material therefrom.

In existing devices of this kind, the passage for the coating material, such as paint, lacquer, enamel, etc. is usually cylindrical with a forwardly tapering or conical portion leading into a short cylindrical orifice in a cylindrical tip from which the material is ejected. There is also a valve for controlling the same. Such valve is of the needle valve type and comprises a cylindrical body portion or shank, a forwardly tapered or conical portion, with or without a cylindrical tip portion at the forward end of the valve. The tapered portions of the passage and the valve seat at or near the forward ends of said portions when the valve is closed, and the taper of the tapered portion of the valve usually is more acute than that of the tapered portion of the passage. When a cylindrical tip is present, its length is very short, so that when the valve is in closed position the forward end of the valve tip and the forward end of the material tip are usually flush or substantially so. Around the material tip is usually an annular and concentric orifice constituting the air discharge opening or orifice at the forward end of the annular air chamber surrounding the material nozzle. In most cases the tip of the valve is tapered.

In such a device when it is desired for certain purposes to spray a very small amount of material, the valve is opened very slightly or, in other words, is throttled. In doing so, the area of the annular port thus created at and between the seating parts of the tapered portions above referred to would usually be less than the cross-sectional area of the annular space between the tips of the valve and the material nozzle. Hence, the latter annular space or orifice would not be filled with material. That would result in a tendency of the material stream to pour off of the lip of the material tip on a bias or in a drifting direction not parallel to the axis of the tip, with the result of the sprayed material, as it is atomized by the air stream, being unequally distributed in the target or pattern of contact with the surface to be coated. This effect would be accentuated with the receding of the usual tip end of the valve in the material tip for then the area of the orifice mouth would be proportionately much larger and for the full area of the orifice of the material tip. The air issuing from the annular air orifice could have no effect on the material at that point or locus.

The present invention comprehends means for wholly avoiding such disadvantages and comprises the idea of providing an elongated cylindrical tip portion at the forward end of the needle valve which tip portion normally extends forwardly exteriorly from the mouth of the material tip, and also has a more or less pointed tip end, which may be conical or conoidal. The length of such cylindrical tip portion of the valve is such, for the range of opening of the valve wherein the port area as compared to the cross-sectional area of the annular space between the cylindrical valve tip and the material tip is less than that of the latter, that there will always be an exteriorly and forwardly extending portion of such cylindrical valve tip portion. This results, up to the limit of that range, in a passage of the material along the surface of the cylindrical tip portion of the valve exteriorly to such locus as where the air projected from the annular air orifice will in its expansion press against and move with the material film on such cylindrical valve tip portion and to the very tip end thereof. The material will pour off the point at the tip of the valve and be uniformly distributed in the air stream so that the intensity of the material in the target or pattern will be even on both sides of the center thereof. Even though the cylindrical valve tip portion be non-coaxial with the material tip, the result is the same, because all the material passing along the surface of the cylindrical valve tip portion pours off the point at the tip end of the valve without any deflection but co-axially with the axis of the material tip and with that of the air orifice.

When the valve port has reached an area equal to or greater than the cross-sectional area of the orifice of the material tip, it is then immaterial whether or not the tip end of the valve recedes in the material tip for then the latter is full of material and the material stream remains co-axial as directed and controlled by the bore of the material nozzle tip itself.

In the present invention, the material pours off of the point of the needle valve in a very fine needle-like stream which then gradually expands and becomes uniformly dispersed in the surrounding air stream so that by the time the mixture reaches the locus where the flattening air side jets engage the mixed stream there is a uniform dispersion of material particles in the so-called atomizing air stream. When the side jets flatten the mixed stream to a flat substantially rectangular pattern or target, the distribution of the material particles, at least lengthwise of such pattern, is even and uniform.

Other objects, advantages, capabilities, features, and the like are comprehended by the invention as will later appear and as are inherently possessed by the invention.

Referring to the drawings:

Fig. 1 is a view partly in elevation and partly in section of a spray gun nozzle embodying the invention;

Fig. 2 is a fragmentary sectional view of the same, on an enlarged scale, with the needle valve slightly open for discharge of a very small amount of material;

Figs. 3, 4 and 5 are transverse sectional views taken in planes represented by lines 3—3, 4—4, and 5—5, in Fig. 2 of the drawings;

Fig. 6 is a similar view, on a smaller scale, with the needle valve in closed position;

Fig. 7 is a similar view with the needle valve in such open position as where the flow of material is at substantially full capacity;

Fig. 8 is a similar view with the needle valve in nearly full and in full open positions;

Fig. 9 is a similar view showing the effect when the needle valve is off center;

Fig. 10 is a fragmentary view showing the use of a needle valve with a conoidal tip end;

Fig. 11 is a view of a target or pattern produced by the invention wherein the material is evenly distributed;

Fig. 12 is a transverse sectional view taken in Fig. 9, to correspond to the section shown in Fig. 4 as respects the structure shown in Fig. 1.

Referring more in detail to the drawings, the embodiment selected to illustrate the invention is shown in connection with a spray gun 1 having the forward body portion 2 thereof connected by a suitable coupling 3 to a nozzle assembly 4. This assembly comprises a material nozzle portion 5 and an air nozzle portion 6.

The material nozzle portion comprises a cylindrical material passage portion 7 leading forwardly to tapered passage portions 8 and 8a, thence to a cylindrical material tip portion 9. The air nozzle portion 6 suitably seats on the material nozzle portion 5 and there is therebetween an annular air chamber 10 with which communicate air supply passages 11. The air chamber 10 leads to an annular air discharge orifice 12 concentric to the material tip 9. The air nozzle portion 6 also has side horns 13 having side jet orifices 14 for projecting flattening air streams, and to which lead air supply passages 15.

In the material nozzle portion is axially movable a needle valve which comprises a cylindrical shank 16, a forwardly extending tapered valve portion 17, and a forward cylindrical tip portion 18, the latter having a conical tip end 19 with an apex 20. This tip end portion may be of conoidal form as shown at 21 in Fig. 10 and have an apex 22. The terms conical and conoidal are used synonymously, with the term conical being generic to and comprehensive of the term conoidal.

Fig. 6 shows the device with the needle valve in closed position. The tapered portion 17 of the needle valve is more acute than the tapered portion 8a of the material passage so that when the valve is in closed position it seats at the forward end of said tapered portion, such as at 23. In such position, it will be noted that the cylindrical valve tip portion 18 extends or protrudes exteriorly of the material tip 9 for a substantial distance.

When the valve is opened but slightly so as to project a small amount of material, the annular valve port as indicated at 24 in Fig. 2, has a cross-sectional area less than that of the annular passage 25 in the tip 9. In other words, the material is throttled at the port 24. The material flows in the form of a hollow cylindrical film F along the surface of the tip 18 of the valve. As this film passes out of the material tip 9, it is engaged by the expanding annular stream of air A being projected out of the annular and concentric air orifice 12. Even though the film of material may be thicker on one side than on the other of the valve tip portion 18, whether due to the valve being off axis as shown in Fig. 9 or to the tendency of the stream to drift in the annular passage 25 in the tip 9, the air stream on contacting such film will so act upon it as to cause the mobile film stream F to so move over the surface of the tip portion 18 and the conical or conoidal tip 19 or 21 as to pour off of the apex 20 or 22 in a fine needle-like stream coaxial with the axis of the valve and the material tip 9, as shown at 26 in Fig. 2. Then the material stream gradually expands into the surrounding air stream as shown at 27 in Fig. 2, and eventually the particles of material are uniformly dispersed and distributed throughout the air stream as shown at 28 in Fig. 2.

The mixed stream is then engaged by air jets projected from the horn or side ports 14 so as to flatten the round stream to form a target or pattern 29 as shown in Fig. 11, which is substantially rectangular in form as shown. By the present invention, the distribution, at least lengthwise of this target or pattern, on both sides of the center 30 thereof, is uniform or even, so that as the gun is so moved as to coat or cover the area, as at 31, the upper and lower portions of such area will be of the same intensity or density of coating, and not have one portion lighter than the other. This is very advantageous when coating with light shades. If slight inequalities occurred therein, the shade would be spoiled or unsatisfactory. The present invention avoids such disadvantage.

The tip portion 18 is of such a length that even when the valve is opened to the extent that the area of the port 24 is as great as or greater than the annular passage 25, as shown in Fig. 7, and where the tip end 19 or 21 of the valve is protruding somewhat, the material will follow the tip portion 18 and pour off of the apex 20 or 22, as before explained. The air stream from the orifice 12 will so expand as to act against the material film, moving over the surface of the cone 19 or conoid 21.

In Fig. 9, is shown, considerably exaggerated, a case where the needle valve is off-axis. In practice it has been found that the maximum deviation of the axes of the valve and the material tip is but a very few thousandths of an inch, so that for all practical purposes the axes are parallel and almost coaxial. In any event, the material pours off the apex 20 or 22 in a straight line substantially along the axis of the material tip 9, and mixes evenly with the air stream as above explained.

In Fig. 8 the needle valve is shown in full lines at about three quarters open position, and in dotted lines in full open position. In such cases, the tip portion 18 has receded sufficiently in the passage of the tip 9 and the tapered portion 8a, that the passage of the tip 9 will be filled before the material issues from the mouth thereof in a solid stream. The air stream will engage with the solid stream of material forwardly of the tip 9. The direction of the material stream is coaxial of the tip 9 and controlled thereby, there being no tendency for the material stream to drift or veer.

While I have herein described and upon the drawings shown an illustrative embodiment of the invention, it is to be understood that the invention is not limited thereto but comprehends other constructions, details, arrangements of parts, features, and the like, without departing from the spirit of the invention.

Having thus disclosed the invention, I claim:

1. A material control means in a spray appliance having a material nozzle and an air nozzle, said material nozzle having a material tip provided with a cylindrical orifice and a tapered passage communicating with said orifice, said air nozzle having an air chamber and an annular air discharge orifice around and concentric with said tip, a needle valve axially movable in said tapered passage and said tip, said valve having a tapered portion adapted to seat in said tapered passage and a cylindrical tip portion of a smaller diameter than the orifice of said material tip to provide an annular passage therebetween, said valve tip portion being rigid and elongated and projecting exteriorly from the orifice of said material tip for a substantial distance when said valve is in partly open position whereby material flows in the form of a film along the surface of said exteriorly projecting valve tip portion to the exterior of the material tip to be engaged while flowing along said surface by and moved with the air stream discharged from said air orifice.

2. A material control means in a spray appliance having a material nozzle and an air nozzle, said material nozzle having a material tip provided with a cylindrical orifice and a tapered passage communicating with said orifice, said air nozzle having an air chamber and an annular discharge orifice around and concentric with said tip, a needle valve axially movable in said tapered passage and said tip, said valve having a tapered portion adapted to seat in said tapered passage and a cylindrical tip portion of a smaller diameter than the orifice of said material tip to provide an annular passage therebetween, said valve tip portion being rigid and elongated and projecting exteriorly from the orifice of said material tip for a substantial distance when said valve is in partly open position whereby material flows in the form of a film along the surface of said exteriorly projecting valve tip portion to the exterior of the material tip to be engaged while flowing along said surface by and moved with the air stream discharged from said air orifice, said valve tip portion having a tapered end tip from which the material pours in a fine stream.

3. A material control means in a spray appliance having a material nozzle and an air nozzle, said material nozzle having a material tip provided with a cylindrical orifice and a tapered passage communicating with said orifice, said air nozzle having an air chamber and an annular air discharge orifice around and concentric with said tip, a needle valve axially movable in said tapered passage and said tip, said valve having a tapered portion adapted to seat in said tapered passage and a cylindrical tip portion of a smaller diameter than the orifice of said material tip to provide an annular passage therebetween, said valve tip portion being rigid and elongated and projecting exteriorly from the orifice of said material tip for a substantial distance when said valve is in partly open position whereby material flows in the form of a film along the surface of said exteriorly projecting valve tip portion to the exterior of the material tip to be engaged while flowing along said surface by and moved with the air stream discharged from said air orifice, said valve tip portion having a conical end tip from the apex of which the material pours in a fine stream.

4. A material control means in a spray appliance having a material nozzle and an air nozzle, said material nozzle having a material tip provided with a cylindrical orifice and a tapered passage communicating with said orifice, said air nozzle having an air chamber and an annular air discharge orifice around and concentric with said tip, a needle valve axially movable in said tapered passage and said tip, said valve having a tapered portion adapted to seat in said tapered passage and a cylindrical tip portion of a smaller diameter than the orifice of said material tip to provide an annular passage therebetween, said valve tip portion being rigid and elongated and projecting exteriorly from the orifice of said material tip for a substantial distance when said valve is in partly open position whereby material flows in the form of a film along the surface of said exteriorly projecting valve tip portion to the exterior of the material tip to be engaged while flowing along said surface by and moved with the air stream discharged from said air orifice, said valve tip portion having at its end a tip of smaller cross-sectional area than said valve tip portion for the pouring off material in a fine stream.

5. A material control means in a spray appliance having a material nozzle and an air nozzle, said material nozzle having a material tip provided with a cylindrical orifice and a tapered passage communicating with said orifice, said air nozzle having an air chamber and an annular air discharge orifice around and concentric with said tip, a needle valve axially movable in said tapered passage and said tip, said valve having a tapered portion adapted to seat in said tapered passage and a cylindrical tip portion of a smaller diameter than the orifice of said material tip to provide an annular passage therebetween, said valve tip portion being rigid and elongated and projecting exteriorly from the orifice of said material tip for a substantial distance when said valve is in partly open position whereby material flows in the form of a film along the surface of said exteriorly projecting valve tip portion to the exterior of the material tip to be engaged while flowing along said surface by and moved with the air stream discharged from said air orifice, said valve tip portion having a conoidal end tip from the apex of which the material pours in a fine stream.

HAROLD L. STRIEGEL.

CERTIFICATE OF CORRECTION.

Patent No. 2,236,551. April 1, 1941.

HAROLD L. STRIEGEL.

It is hereby certified that error appears in the printed specification of the above numbered patent requiring correction as follows: Page 3, first column, line 42, claim 2, after the word "annular" insert --air--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.